United States Patent Office

2,808,382
Patented Oct. 1, 1957

2,808,382

WAX COATING COMPOSITION

Eugene A. Jakaitis, Morton, Pa., assignor to The Atlantic Refining Company, Philadelphia, Pa., a corporation of Pennsylvania No Drawing. Application March 4, 1955,
Serial No. 492,301

1 Claim. (Cl. 260—28.5)

My invention relates to a surface coating composition for paper or paperboard, and more particularly to a wax-type coating composition for milk, ice cream, frozen food and other similar containers comprising a mixture of microcrystalline waxes, paraffin waxes, petroleum oils and polyethylene.

The paperboard milk container industry in the United States within recent years set an all-time record by producing 8.5 billion containers, a 326% increase since the end of World War II. Figures show that 38% of all milk sold for beverage purposes in 1952 was packaged in paperboard containers. As the paperboard milk container industry has expanded, manufacturers of wax have continuously directed their research efforts toward the development of superior and less expensive coating compositions. Insofar as paperboard milk cartons are concerned, the primary problems involved are those of developing a wax coating composition which will prevent the wax from flaking and contaminating the milk and which will prevent the milk from leaking through the paperboard either during the storage of the milk containing carton or during subsequent transportation and handling operations. This means that the coated milk carton must be able to withstand both impact forces and stress concentrations. Since the filled containers must be maintained at rather low temperatures to avoid spoilage of their contents, the problem of developing a suitable wax coating composition is made more difficult than in the case of wax coating compositions which are to be utilized on paper employed at room temperatures, due to the inherent brittleness of waxes or wax compositions at the lower temperatures.

Thus, my invention has as its object, among others, the provision of an improved coating composition for paperboard milk containers comprising a mixture of polyethylene, microcrystalline waxes, paraffin waxes, technical eicosane, and petroleum oil which will permit the paperboard milk container to withstand substantial impact and flexure forces under low temperature conditions without developing wax flaking, undesirable cracks or fissures in the protective coating. Other objects of my invention will become apparent after reading the following more detailed description.

In its broader aspects, my invention contemplates a coating composition containing the following ingredients:

| | Weight percent |
|---|---|
| Polyethylene | 0.1–3.0 |
| Microcrystalline wax | 5.0–25.0 |
| Paraffin wax | 93.9–47.0 |
| Technical eicosane | 0.0–15.0 |
| Petroleum oil | 1.0–10.0 |

Within the above broad ratio of components the following narrower ranges are preferred:

| | Weight percent |
|---|---|
| Polyethylene | 0.3–1.0 |
| Microcrystalline wax | 10.0–25.0 |
| Paraffin wax | 83.7–56.0 |
| Technical eicosane | 5.0–15.0 |
| Petroleum oil | 1.0–3.0 |

Polyethylene can be produced by a variety of methods as is well known to those skilled in the art. For example, a high temperature and pressure method of preparing high molecular weight ethylene polymers is described in detail in U. S. No. 2,153,553 issued to E. W. Fawcett et al. on April 11, 1939. Polyethylene is thermoplastic at temperatures above 130° C., and is quite tough although relatively inelastic. Polyethylene is odorless, tasteless, and non-toxic, translucent white in color and resembles paraffin wax in appearance and texture. Polyethylene polymers vary in weight but for most purposes polymers having molecular weights of about 2,000 to 21,000 have been found most suitable for my purposes, although this range is not particularly critical and molecular weights outside of this range can be employed. Polyethylene of approximately 2100 molecular weight has been found to be particularly suitable in accordance with this invention.

Microcrystalline waxes are well known to those in the petroleum art and such products have also been designated as amorphous or petrolatum waxes. The customary melting point range of circrocrystalline waxes is from about 140 to 200° F. A 175–180° F. microcrystalline wax of about 2% oil content has been found to be particularly suitable in accordance with this invention. The available commercial grades vary somewhat in hardness and melting point. Microcrystalline wax is to be distinguished from paraffin wax which is derived from more volatile and lighter fractions in the distillation of petroleum and is markedly crystalline and brittle compared to microcrystalline wax which is non-brittle.

By paraffin or paraffin wax, I mean crystalline petroleum products which are removed from distillates or overhead stocks by sweating or solvent separation. These waxes ordinarily have a melting point in the general range of 115° to 150° F. Paraffin waxes are generally agreed to have a plate-like crystalline structure. They are relatively hard, brittle and fairly easily fractured. Paraffin wax is generally obtained from the wax-containing oil distillate fraction, and is separated by oil-removal methods, such as chilling and subsequent refining operations (e. g. sweating) to yield the paraffin wax of the kind described above. Paraffin waxes of about 125–129 melting point and having an oil content of approximately 1.0% have been found to be particularly suitable in accordance with this invention.

Technical eicosane as used herein refers to a particular low melting paraffin wax fraction comprising a mixture of $C_{19}$, $C_{20}$ and $C_{21}$ normal paraffins, for example, in approximately the ratio of 1:2:1 together with very minor amounts of higher and lower molecular weight paraffins.

In general, however, any low melting paraffin wax mixture having an average molecular weight in the eicosane range, i. e., from $C_{19}$ to $C_{21}$, may be employed instead of the technical eicosane described herein above. Accordingly, the term technical eicosane as used herein and in the appended claims refers to mixtures of normal paraffins ranging from $C_{19}$ to $C_{21}$ and averaging about $C_{20}$ in molecular weight, such mixture also containing minor amounts of higher and lower molecular weight normal paraffins and their isomers.

The petroleum oil may be nearly any hydrocarbon oil liquid at room temperature. It is preferable to use highly refined white oil.

It is not absolutely necessary for the oil or the eicosane to be added as separate constituents. They may be present as part of the paraffin wax provided they are contained in the proper ratios in these waxes. However, so far it has been very difficult to obtain the proper ratios of technical eicosane and petroleum oil by co-producing them with the paraffin wax.

Preparation of the instant novel composition can be most easily accomplished by heating either the paraffin wax or the microcrystalline wax or a combination of paraffin and microcrystalline waxes to an elevated temperature, preferably 220–240° F., and thereafter adding the polyethylene under conditions of high shear rate agitation to effect uniform mixing. The petroleum oil may be added either prior to or subsequent to the addition of the polyethylene. As a general rule, we find it undesirable to attempt to first heat up the polyethylene and then add the wax and oil fractions.

The compositions of the instant invention are most suitably employed to coat milk cartons at temperatures above the melting point of the composition, preferably at a temperature between about 150° and 220° F. In one particular milk carton coating machine the carton is immersed in wax at 170° F. and passed through an air-cooled chamber (45° F.); the base is shock chilled by immersion in ½ inch deep water bath at 35° F. The waxed carton is then filled with cold milk (37° F.) and sealed. While being handled, the filled cartons are usually kept at refrigerator temperatures (40–50° F.) and it is during this time that many of the failures occur with the coating compositions known heretofore.

Oxidation inhibitors, anti-foamant compositions, etc., may be added to the coating composition of this invention as will be obvious to those skilled in the milk carton coating art.

While there are above disclosed but a limited number of embodiments of this invention, it is possible to produce still other embodiments without departing from the inventive concepts herein disclosed and it is therefore desired that only such limitations be imposed on the appended claim as are stated therein or required by the prior art.

I claim:

A wax coating composition consisting of between about 0.3–1.0 weight percent polyethylene, 10.0–25.0 weight percent microcrystalline wax, 56.0–83.7 weight percent paraffin wax, 5.0–15.0 weight percent technical eicosane and 1.0–3.0 weight percent petroleum oil.

References Cited in the file of this patent

UNITED STATES PATENTS

| | | |
|---|---|---|
| 2,560,773 | Lovell | July 17, 1951 |
| 2,612,458 | Stedman | Sept. 30, 1952 |